(12) United States Patent
Cho et al.

(10) Patent No.: US 9,256,011 B2
(45) Date of Patent: Feb. 9, 2016

(54) LIQUID CRYSTAL DISPLAY DEVICE AND METHOD OF FABRICATING THE SAME

(75) Inventors: Hang-Sup Cho, Paju-si (KR); Woo-Hyun Kwon, Seongnam-si (KR)

(73) Assignee: LG DISPLAY CO., LTD., Seoul (KR)

( * ) Notice: Subject to any disclaimer, the term of this patent is extended or adjusted under 35 U.S.C. 154(b) by 531 days.

(21) Appl. No.: 13/545,633

(22) Filed: Jul. 10, 2012

(65) Prior Publication Data

US 2013/0016293 A1 Jan. 17, 2013

(30) Foreign Application Priority Data

Jul. 12, 2011 (KR) .......................... 10-2011-0068728

(51) Int. Cl.
*G02F 1/1335* (2006.01)
*G02B 5/20* (2006.01)
*G02F 1/1339* (2006.01)

(52) U.S. Cl.
CPC ............ *G02B 5/201* (2013.01); *G02F 1/13394* (2013.01); *G02F 1/133512* (2013.01)

(58) Field of Classification Search
CPC ............. G02B 27/225; H04N 13/0434; G02F 1/13363; G02F 1/136209; G02F 1/133512; G02F 1/136213; G09G 2320/0209
USPC .................................................. 349/15, 110
See application file for complete search history.

(56) References Cited

U.S. PATENT DOCUMENTS

| | | | |
|---|---|---|---|
| 2005/0122442 A1* | 6/2005 | Park ................................ | 349/43 |
| 2005/0219436 A1* | 10/2005 | Kwon et al. .................... | 349/44 |
| 2009/0166633 A1* | 7/2009 | Lee et al. ........................ | 257/59 |
| 2010/0289884 A1* | 11/2010 | Kang .............................. | 348/58 |
| 2012/0140129 A1* | 6/2012 | Chang et al. ................... | 349/15 |

FOREIGN PATENT DOCUMENTS

| | | | |
|---|---|---|---|
| CN | 101093329 A | | 12/2007 |
| CN | 101888564 A | | 11/2010 |
| CN | 102116960 A | | 7/2011 |
| KR | 1020050034850 | | 4/2005 |
| KR | 10-2007-0069829 | * | 7/2007 |
| KR | 1020070069829 | | 7/2007 |
| KR | 10-2009-0050865 | * | 5/2009 |
| KR | 1020090050865 | | 5/2009 |

OTHER PUBLICATIONS

Office Action issued in corresponding Korean Patent Application No. 10-2011-0068728, mailed Jan. 16, 2014, 5 pages.
Office Action issued in Chinese Patent Application No. 201210240721.0, mailed Jul. 15, 2014, 26 pages.

* cited by examiner

*Primary Examiner* — Richard Kim
*Assistant Examiner* — Ryan Crockett
(74) *Attorney, Agent, or Firm* — Brinks Gilson & Lione

(57) ABSTRACT

A liquid crystal display device includes: first and second substrates; a gate line and a data line on an inner surface of the first substrate; a thin film transistor connected to the gate line and the data line; a plurality of pixel electrodes and a plurality of common electrodes in the pixel region; a color filter layer on an inner surface of the second substrate; a black stripe and a column spacer on the color filter layer, the black stripe having a first thickness and the column spacer having a second thickness greater than the first thickness, and the black stripe corresponding to the gate line; and a liquid crystal layer between the first and second substrates.

19 Claims, 10 Drawing Sheets

LIQUID CRYSTAL DISPLAY DEVICE AND METHOD OF FABRICATING THE SAME

This application claims the priority and the benefit under 35 U.S.C. §119(a) on Korean Patent Application No. 10-2011-0068728, filed on Jul. 20, 2011, the entire contents of which are hereby incorporated by reference.

BACKGROUND

1. Field of the Invention

The present disclosure relates to a liquid crystal display device, and more particularly, to a liquid crystal display device and a method of fabricating the liquid crystal display device where fabrication process is simplified.

2. Discussion of the Related Art

Recently, a liquid crystal display (LCD) device has been in the spotlight because the LCD has high value added due to its low-power consumption and good portability.

An active matrix liquid crystal display (AM-LCD) device, which includes thin film transistors as a switching device for a plurality of pixels, has been widely used due to its high resolution and superiority in displaying moving images.

In general, the LCD device is fabricated through an array substrate process for forming a thin film transistor and a pixel electrode on an array substrate, a color filter substrate process for forming a color filter layer and a common electrode on a color filter substrate and a cell process for forming a liquid crystal layer between the array substrate and the color filter substrate.

FIG. 1 is a cross-sectional view showing a liquid crystal display device according to the related art. In FIG. 1, a liquid crystal display (LCD) device 35 according to the related art includes an array substrate 40, a color filter substrate 70 and a liquid crystal layer 90. The array substrate 40 and the color filter substrate 70 face and are spaced apart from each other, and the liquid crystal layer 90 is between the array substrate 40 and the color filter substrate 70.

A gate electrode 45 and a gate line 43 are formed on an inner surface of the array substrate 40, and a gate insulating layer 47 is formed on the gate electrode 45 and the gate line 43. A semiconductor layer 50 including an active layer 50a and an ohmic contact layer 50b is formed on the gate insulating layer 47 over the gate electrode 45, and source and drain electrodes 58 and 60 are formed on the semiconductor layer 50. The source and drain electrode 58 and 60 contact the ohmic contact layer 50b and are spaced apart from each other.

In addition, a passivation layer 63 is formed on the source and drain electrodes 58 and 60, and a pixel electrode 67 of a transparent conductive material is formed on the passivation layer 63. The passivation layer 63 has a drain contact hole 65 exposing the drain electrode 60 and the pixel electrode 67 is connected to the drain electrode 60 through the drain contact hole 65.

A black matrix 73 of a lattice shape having a plurality of openings is formed on an inner surface of the color filter substrate 70, and a color filter layer 76 including red, green and blue color filters 76a, 76b and 76c is formed on the black matrix 73. The red, green and blue color filters 76a, 76b and 76c are sequentially disposed in the plurality of openings. A common electrode 79 of a transparent conductive material is formed on the color filter layer 76. In addition, a plurality of column spacers 83 are formed on the common electrode 79. The plurality of column spacers 63 are spaced apart from one another and contact the common electrode 79 and the passivation layer 63.

Although not shown, an orientation layer for an initial alignment of liquid crystal molecules is formed on each of the pixel electrode 67 of the array substrate 40 and the common electrode 79 of the color filter substrate 70. A liquid crystal layer 90 is formed between the orientation layers of the array substrate 40 and the color filter substrate 70.

In the LCD device 35, the pixel electrode 67 is formed over the array substrate 40 and the common electrode 79 is formed over the color filter substrate 70 such that the liquid crystal molecules of the liquid crystal layer 90 are driven by a vertical electric field generate between the pixel electrode 79 and the common electrode 79.

Recently, an in-plane switching (IPS) mode LCD device, where the pixel electrode and the common electrode are formed over the array substrate and the black matrix, the color filter layer, the overcoat layer and the column spacer are formed over the color filter substrate, has been suggested. In the IPS mode LCD device, since the liquid crystal molecules of the liquid crystal layer are driven by a horizontal electric field between the pixel electrode and the common electrode, a property in a viewing angle is improved.

The color filter substrate for the LCD device according to the related art may be fabricated through a five-mask process. For example, the color filter substrate for the IPS mode LCD device may be fabricated through a five-mask process including: a step of forming the black matrix (a first mask process); steps of forming the red, green and blue color filters for the color filter layer (second to fourth mask processes); and a step of forming the column spacer (a fifth mask process) without a step of forming the common electrode.

The mask process may be defined by a photolithographic process and an etching process. For example, the mask process may include a plurality of unit steps such as a step of forming a photoresist layer having a photosensitivity on a material layer over a substrate, a step of irradiating a light onto the photoresist layer through a photomask having a transmissive area and a blocking area, a step of developing the irradiated photoresist layer to form a photoresist pattern, a step of etching the material layer using the photoresist pattern as an etching mask, and a step of stripping the photoresist pattern.

Accordingly, the mask process requires a plurality of apparatuses for the plurality of unit steps and a plurality of materials for the plurality of unit steps. In addition, it takes much time to perform the plurality of unit steps for the mask process. Since the mask process includes the plurality of unit steps, increase in number of the mask process causes increase in fabrication cost and fabrication time. For the purpose of reducing fabrication cost and improving productivity of the LCD device, it is required to reduce the number of the mask process.

BRIEF SUMMARY

A liquid crystal display device includes: first and second substrates facing and spaced apart from each other; a gate line and a data line on an inner surface of the first substrate, the gate line and the data line crossing each other to define a pixel region; a thin film transistor connected to the gate line and the data line; a plurality of pixel electrodes and a plurality of common electrodes in the pixel region, the plurality of pixel electrodes and the plurality of common electrodes alternating with each other; a color filter layer on an inner surface of the second substrate, the color filter layer including red, green and blue color filters; a black stripe and a column spacer on the color filter layer, the black stripe having a first thickness and the column spacer having a second thickness greater than the first thickness, and the black stripe corresponding to the gate line; and a liquid crystal layer between the first and second substrates.

In another aspect, a three-dimensional image display system includes: a liquid crystal display device including: first and second substrates facing and spaced apart from each other: a gate line and a data line on an inner surface of the first substrate, the gate line and the data line crossing each other to define a pixel region; a thin film transistor connected to the gate line and the data line; a plurality of pixel electrodes and a plurality of common electrodes in the pixel region, the plurality of pixel electrodes and the plurality of common electrodes alternating with each other; a color filter layer on an inner surface of the second substrate, the color filter layer including red, green and blue color filters; a black stripe and a column spacer on the color filter layer, the black stripe having a first thickness and the column spacer having a second thickness greater than the first thickness, and the black stripe corresponding to the gate line; and a liquid crystal layer between the first and second substrates; and a patterned retarder on an outer surface of the second substrate, the patterned retarder including first and second regions alternating with each other, wherein the black stripe corresponds to a border portion between the first and second regions.

In another aspect, a method of fabricating a liquid crystal display device includes: forming a gate line and a data line on a first substrate, the gate line and the data line crossing each other to define a pixel region; forming a thin film transistor connected to the gate line and the data line; forming a plurality of pixel electrodes and a plurality of common electrodes in the pixel region, the plurality of pixel electrodes and the plurality of common electrodes alternating with each other; forming a color filter layer on a second substrate, the color filter layer including red, green and blue color filters; forming a black stripe and a column spacer on the color filter layer, the black stripe having a first thickness and the column spacer having a second thickness greater than the first thickness; attaching the first and second substrates such that the black stripe is between the first and second substrates and the black stripe corresponds to the gate line; and forming a liquid crystal layer between the first and second substrates.

In another aspect, a method of fabricating a three-dimensional image display system includes: forming a gate line and a data line on a first substrate, the gate line and the data line crossing each other to define a pixel region; forming a thin film transistor connected to the gate line and the data line; forming a plurality of pixel electrodes and a plurality of common electrodes in the pixel region, the plurality of pixel electrodes and the plurality of common electrodes alternating with each other; forming a color filter layer on a second substrate, the color filter layer including red, green and blue color filters; forming a black stripe and a column spacer on the color filter layer, the black stripe having a first thickness and the column spacer having a second thickness greater than the first thickness; attaching the first and second substrates such that the black stripe is between the first and second substrates and the black stripe corresponds to the gate line; forming a liquid crystal layer between the first and second substrates; and attaching a patterned retarder on an outer surface of the second substrate, the patterned retarder including first and second regions alternating with each other, wherein the black stripe corresponds to a border portion between the first and second regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail to the embodiments, examples of which are illustrated in the accompanying drawings.

Figure 1:
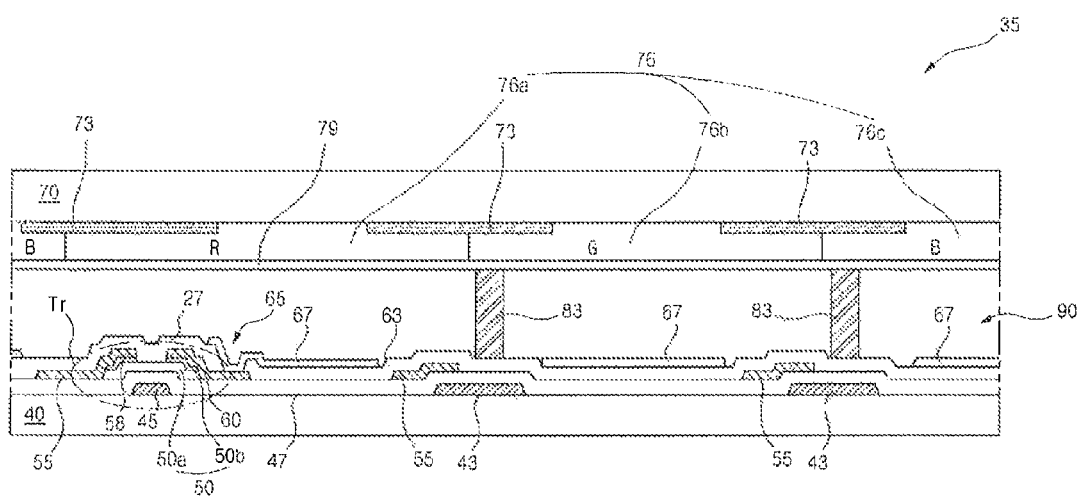
FIG. 1 is a cross-sectional view showing a liquid crystal display device according to the related art.
Figure 2:
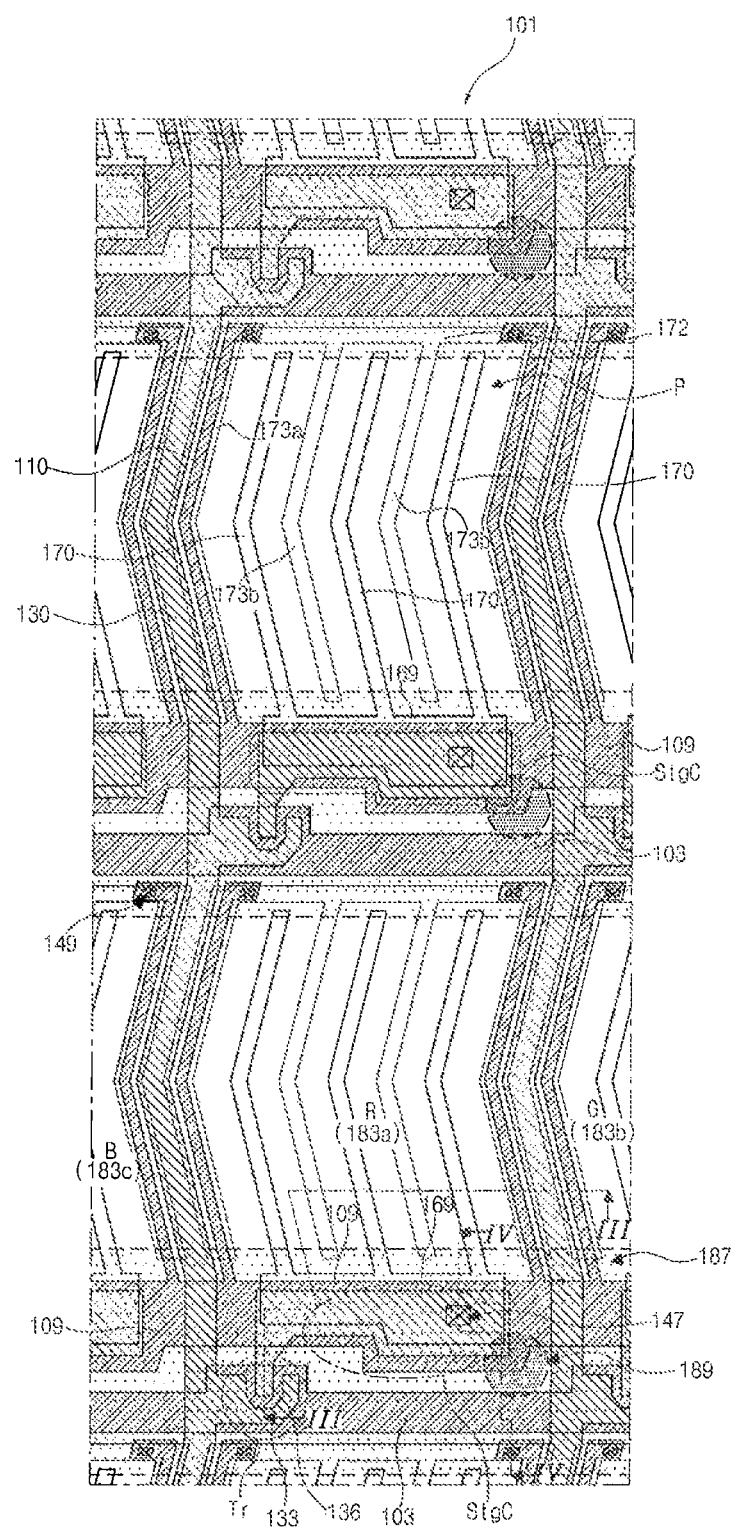
FIG. 2 is a plan view showing a liquid crystal display device according to an embodiment of the present invention.
Figure 3:
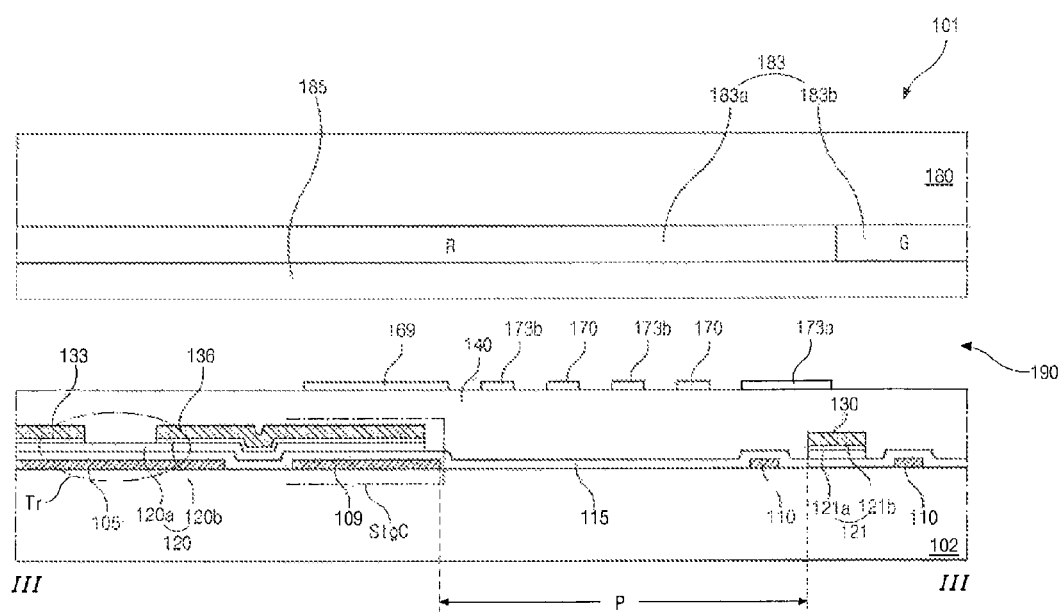
FIG. 3 is a cross-sectional view taken along a line III-III of FIG. 2.
Figure 4:
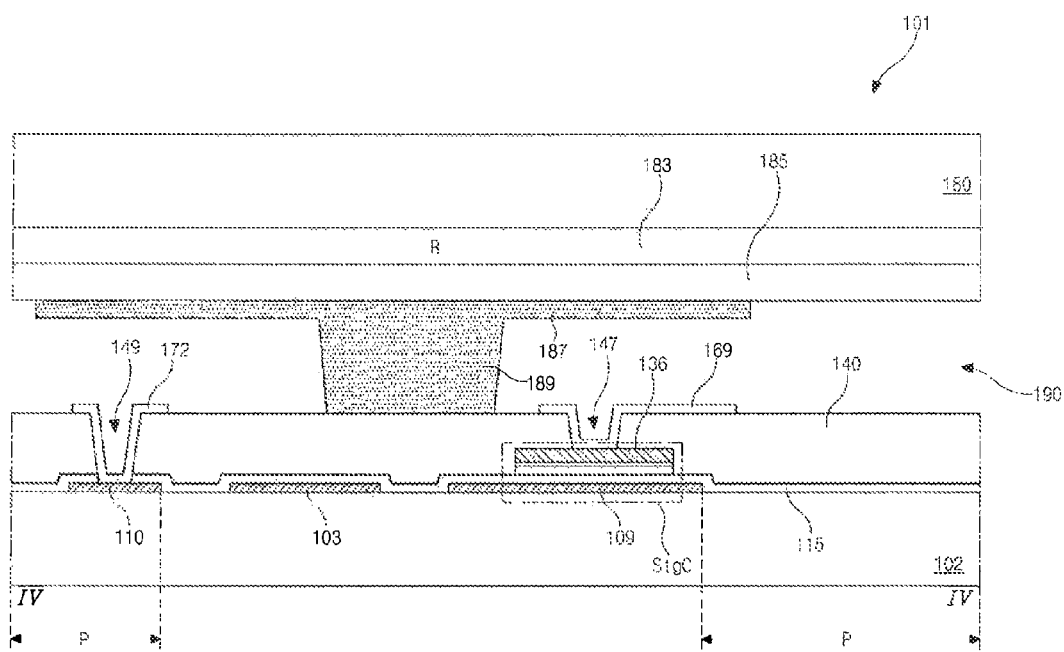
FIG. 4 is a cross-sectional view taken along a line IV-IV of FIG. 2.

FIG. 2 is a plan view showing a liquid crystal display device according to an embodiment of the present invention, FIG. 3 is a cross-sectional view taken along a line III-III of FIG. 2, and FIG. 4 is a cross-sectional view taken along a line IV-IV of FIG. 2.

In FIGS. 2, 3 and 4, a liquid crystal display device 101 includes a first substrate 102, a second substrate 180 and a liquid crystal layer 190 between the first and second substrates 102 and 180. The first and second substrates 102 and 180 face into and are spaced apart from each other. In addition, the first substrate 102 having a plurality of elements such as a gate line, a data line and a thin film transistor may be referred to as an array substrate, and a second substrate 180 having a plurality of elements such as a color filter layer, an overcoat layer and a column spacer may be referred to as a color filter substrates.

A gate line 103 and a gate electrode 105 are formed on an inner surface of the first substrate 102. The gate electrode 105 is connected to the gate line 103. Although the gate electrode 105 protrudes from the gate line 103 in FIG. 2, the gate line itself may function as the gate electrode in another embodiment.

A common line 109 and an auxiliary common line 110 are formed on the inner surface of the first substrate 102. The common line 109 may be parallel to and spaced apart from the gate line 103, and the auxiliary common line 110 may extend from the common line 109 and may be disposed in a boundary portion of a pixel region P. In addition, the auxiliary common line 110 may be parallel to and adjacent to a data line 130 in a border portion of the adjacent pixel regions P.

The gate line 103, the gate electrode 105, the common line 109 and the auxiliary common line 110 may include at least one of metallic materials such as aluminum (Al), aluminum alloy (e.g., aluminum neodymium (AlNd)), copper (Cu), copper alloy, molybdenum (Mo) and molybdenum alloy (e.g., molybdenum titanium (MoTi)) and may have a single-layered structure or a multiple-layered structure. For example, the gate line 103, the gate electrode 105, the common line 109 and the auxiliary common line 110 may have a single-layered structure in FIGS. 2, 3 and 4.

A gate insulating layer 115 is formed on the gate line 103, the gate electrode 105, the common line 109 and the auxiliary common line 110. The gate insulating layer 115 may include an inorganic insulating material such as silicon oxide ($SiO_2$) and silicon nitride (SiNx). In addition, a semiconductor layer 120 is formed on the gate insulating layer 115 over the gate electrode 105. The semiconductor layer 120 may include an active layer 120a of intrinsic amorphous silicon and an ohmic contact layer 120b of an impurity-doped amorphous silicon. The ohmic contact layer 120b includes two portions spaced apart from each other on the active layer 120a.

Source and drain electrodes 133 and 136 are formed on the semiconductor layer 120. The source and drain electrodes 133 and 136 are spaced apart from each other on the two portions of the ohmic contact layer 120b to expose the active layer 120a. In addition, the source electrode 133 may have a bar shape and the drain electrode 136 may have a "U" shape over the gate electrode 105. Alternatively, the source electrode 133 may have a "U" shape and the drain electrode 136 may have a bar shape over the gate electrode 105. Accordingly, a channel defined by a portion of the active layer 120a exposed between the source and drain electrodes 133 and 136 may have a "U" shape. The shapes of the source and drain electrodes 133 and 136 may vary in another embodiment. Further, the drain electrode 136 may extend to the common line 109 to constitute a storage capacitor StgC with the common line 109.

The gate electrode 105, the gate insulating layer 115, the semiconductor layer 120 including the active layer 120a and the ohmic contact layer 120b, the source electrode 133 and the drain electrode 136 constitute a thin film transistor (TFT) Tr of a switching element.

A data line 130 is formed on the gate insulating layer 115. The data line 130 crosses the gate line 103 to define the pixel region P. In addition, the data line 130 is connected to the source electrode 133.

First and second dummy patterns 121a and 121b are sequentially formed between the gate insulating layer 115 and the data line 130. The first dummy pattern 121a has the same layer and the same material as the active layer 120a, and the second dummy pattern 121b has the same layer and the same material, as the ohmic contact layer 120b. The first and second dummy patterns 121a and 121b are formed according to a fabrication process for the array substrate. For example, the first and second dummy patterns 121a and 121b may be formed when the semiconductor layer 120, the source electrode 133, the drain electrode 136 and the data line 130 are patterned by using a single photomask. In another embodiment where a photomask for the semiconductor layer is different from a photomask for the source electrode, the drain electrode and the data line, the first and second dummy patterns 121a and 121b may be omitted.

A passivation layer 140 is formed on the source electrode 133, the drain electrode 136 and the data line 130. The passivation layer 140 may include an organic insulating material such as benzocyclobutene (BCB) and acrylic resin. In addition, the passivation layer 140 may have a flat top surface so that the first substrate 102 having the TFT Tr can be planarized. An additional passivation layer of an inorganic insulating material such as silicon oxide ($SiO_2$) and silicon nitride (SiNx) may be formed between the TFT Tr and the passivation layer 140. The passivation layer 140 has a drain contact hole 147 exposing the drain electrode 136, and the passivation layer 140 and the gate insulating layer 115 have a common contact hole 149 exposing the auxiliary common line 110.

A plurality of pixel electrodes 170 are formed on the passivation layer 140 in the pixel region P. The plurality of pixel electrodes 170 may include a metallic material such as molybdenum (Mo), molybdenum titanium (MoTi) and titanium (Ti). In addition, the plurality of pixel electrodes 170 are connected to the drain electrode 136 through the drain contact hole 147. The plurality of pixel electrodes 170 each having a bar shape are spaced apart from one another and end portions of the plurality of pixel electrodes 170 are connected to one another by an auxiliary pixel pattern 169.

Further, a plurality of common electrodes 173a and 173b alternating with the plurality of pixel electrodes 170 are formed on the passivation layer 140 in the pixel region P. The plurality of common electrodes 173a and 173b may have the same material and the same layer as the plurality of pixel electrodes 170. In addition, the plurality of common electrodes 173a and 173b are connected to the auxiliary common line 110 through the common contact hole 149. The plurality of common electrodes 173a and 173b each having a bar shape are spaced apart from one another and end portions of the plurality of common electrodes 173a and 173b are connected to one another by an auxiliary common pattern 172.

An outermost common electrode 173a of the plurality of common electrodes 173a and 173b is disposed at a boundary portion of the pixel region P. The outermost common electrode 173a overlaps the auxiliary common line 110 and the data line 130. As a result, the outermost common electrode 173a covers and shields a gap region between the data line 130 and the auxiliary common line 110 so that light through the gap region can be blocked by the outermost common electrode 173a and a light leakage can be prevented.

The data line 130, the plurality of common lines 173a and 173b and the pixel electrode 170 have a bent shape symmetrical with respect to a horizontal central line of the pixel region P. For example, each of the data line 130, the plurality of common lines 173a and 173b and the pixel electrode 170 may have a bent portion along the horizontal central line. As a result, the pixel region P may have two domains so that deterioration such as a color shift according to an azimuthal angle can be prevented. In another embodiment, the data line 130, the plurality of common lines 173a and 173b and the pixel electrode 170 may have a bent portion along a line different from the horizontal central line.

A color filter layer 183 including red, green and blue color filters 183a, 183b and 183c is formed on an inner surface of the second substrate 180. Each of the red, green and blue color filters 183a, 183b and 183c corresponds to the pixel region P and the red, green and blue color filters 183a, 183b and 183c are disposed sequentially and repeatedly. Boundaries among the red, green and blue color filters 183a, 183b and 183c correspond to the gate line 103 and the data line 130 disposed at the boundary portion of the pixel region P.

An overcoat layer 185 is formed on the color filter layer 183. The overcoat layer 185 may include a transparent organic material such as benzocyclobutene (BCB) and acrylic resin. In addition, the overcoat layer 185 may have a thickness of about 2 μm to about 4 μm and may have a flat top surface. The overcoat layer 185 may be omitted in another embodiment.

Further, a black stripe 187 and a column spacer 189 are formed on the overcoat layer 185. The black stripe 187 has a first thickness and corresponds to the gate line 103 and the common line 109. For example, the black stripe 187 may completely cover the gate line 103 and the common line 109. The column spacer 189 has a pillar shape and has a second thickness greater than the first thickness. The second thickness may correspond to a gap distance between the first and second substrates 102 and 180 and the gap distance between the first and second substrates 102 and 108 may be kept constant by the column spacer 189.

The black stripe 187 and the column spacer 189 may include a photosensitive organic material having a black pigment. As a result, the black stripe 187 may function as a black matrix that blocks light. In addition, the black stripe 187 and the column spacer 189 are formed through a single mask process. Since the color filter substrate is fabricated without forming a black matrix, fabrication process for the color filter substrate is simplified and fabrication cost for the color filter substrate is reduced due to reduction in the number of mask processes.

A method of fabricating a color filter substrate for an LCD device according to an embodiment of the present invention will be illustrated hereinafter.

FIGS. 5A to 5D are cross-sectional views, which are taken along a line III-III of FIG. 2, showing a method of fabricating a color filter substrate for a liquid crystal display device according to an embodiment of the present invention, and FIGS. 6A to 6D are cross-sectional views, which are taken along a line IV-IV of FIG. 2, showing a method of fabricating a color filter substrate for a liquid crystal display device according to an embodiment of the present invention.

Figure 5A:
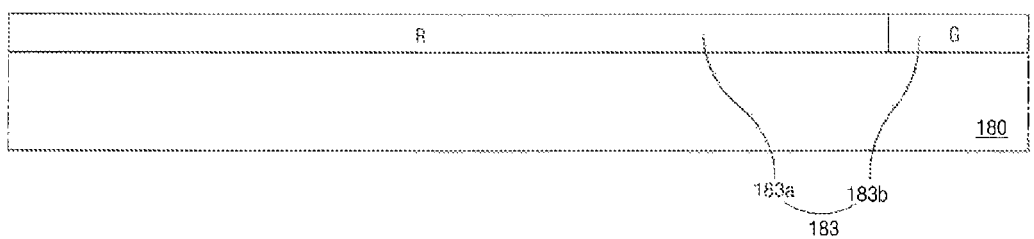
FIGS. 5A to 5D are cross-sectional views, which are taken along a line III-III of FIG. 2, showing a method of fabricating a color filter substrate for a liquid crystal display device according to an embodiment of the present invention.
Figure 6A:
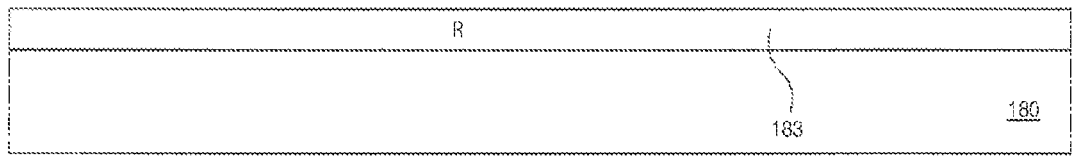
FIGS. 6A to 6D are cross-sectional views, which are taken along a line IV-IV of FIG. 2, showing a method of fabricating a color filter substrate for a liquid crystal display device according to an embodiment of the present invention.

In FIGS. 5A and 6A, a red photoresist (PR) (not shown) is coated on an entire surface of a second substrate 180 to form a red PR layer (not shown) and the red PR layer is patterned through a first mask process to form a red color filter 183a. Next, a green PR (not shown) is coated on the entire surface of the second substrate 180 having the red color filter 183a to form a green PR layer (not shown) and the green PR layer is patterned through a second mask process to form a green color filter 183b. Similarly, a blue PR (not shown) is coated on the entire surface of the second substrate 180 having the red and green color filters 183a and 183b to form a blue PR layer (not shown) and the blue PR layer is patterned through a third mask process to form a blue color filter 183c (of FIG. 2).

As a result, a color filter layer 183 including the red, green and blue color filters 183a, 183b and 183c is formed on the second substrate 180. The red, green and blue color filters 183a, 183b and 183c are disposed sequentially and repeatedly. In addition, each of the red, green and blue color filters 183a, 183b and 183c corresponds to the pixel region P, and a border among the red, green and blue color filters 183a, 183b corresponds to a boundary of the pixel region P.

Figure 5B:
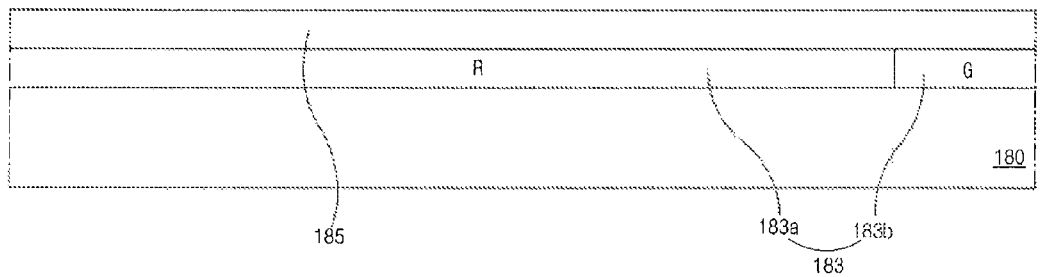
Figure 6B:
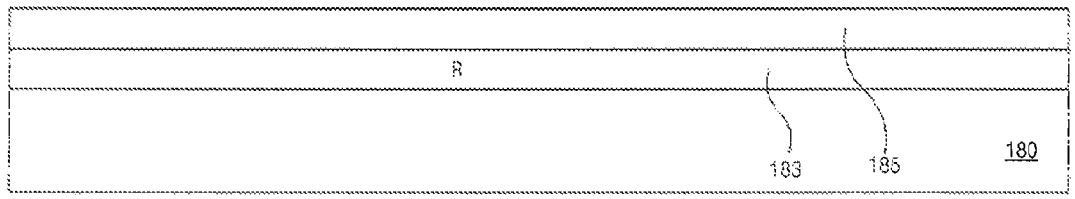

In FIGS. 5B and 6B, a transparent organic material such as benzocyclobutene (BCB) and acrylic resin is coated on the entire surface of the second substrate 180 having the color filter layer 183 to form an overcoat layer 185 having a flat top surface on the color filter layer 183.

Figure 5C:
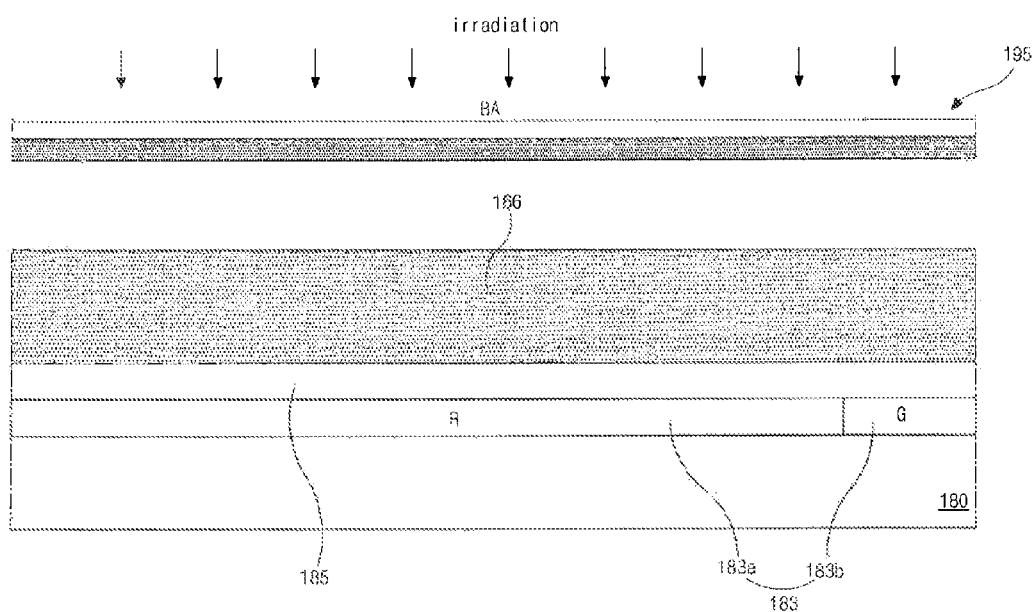
Figure 6C:
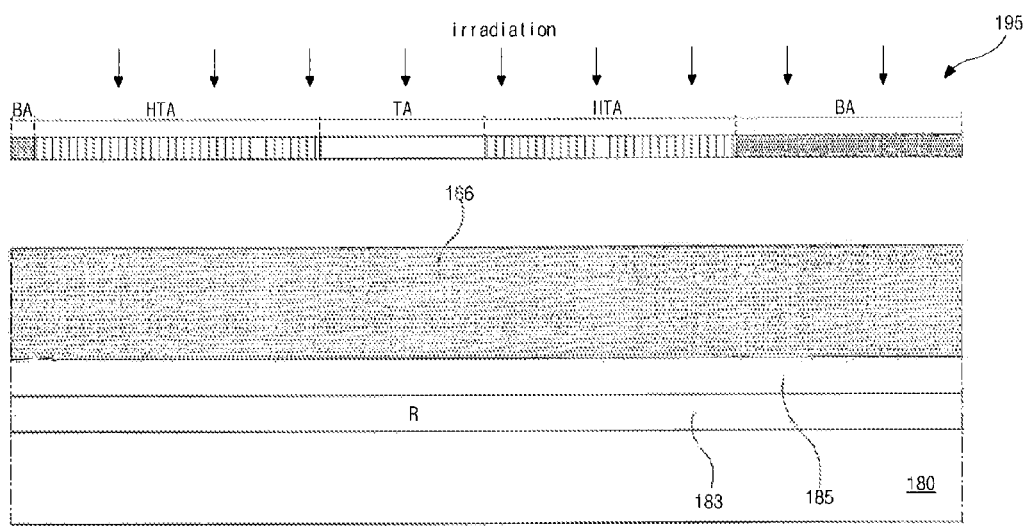

In FIGS. 5C and 6C, a photosensitive organic material having a black pigment is coated on an entire surface of the second substrate 180 having the color filter layer 183 and the overcoat layer 185 to form a black PR layer 186. For example, the photosensitive organic material may include a PR having a black pigment. Next, a photomask 195 having a blocking area BA, a transmissive area TA and a half-transmissive area HTA is disposed over the black PR layer 186. A transmittance of the half-transmissive area HTA is greater than a transmittance of the blocking area BA and is smaller than a transmittance of the transmissive area TA. For example, the transmittance of the half-transmissive area HTA may be within a range of about 10% to about 90% of the transmittance of the transmissive area TA.

In addition, the black PR layer 186 may have a negative photosensitive type where an irradiated portion remains and a non-irradiated portion is removed after development. When the black PR layer 186 has a negative photosensitive type, the photomask 195 may be disposed such that the transmissive area TA corresponds to the column spacer 189 (of FIG. 4) and the half-transmissive area HTA corresponds to the black stripe 187 (of FIG. 4). The blocking area corresponds to the other portion where the black PR layer 186 is removed.

Next, a light is irradiated onto the black PR layer 186 through the photomask 195. The step of irradiating a light onto the black PR layer 186 may be referred to as a diffraction exposure or a halftone exposure.

Figure 5D:
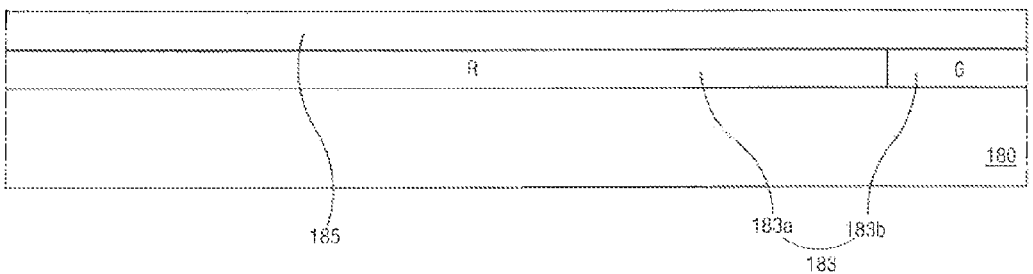
Figure 6D:
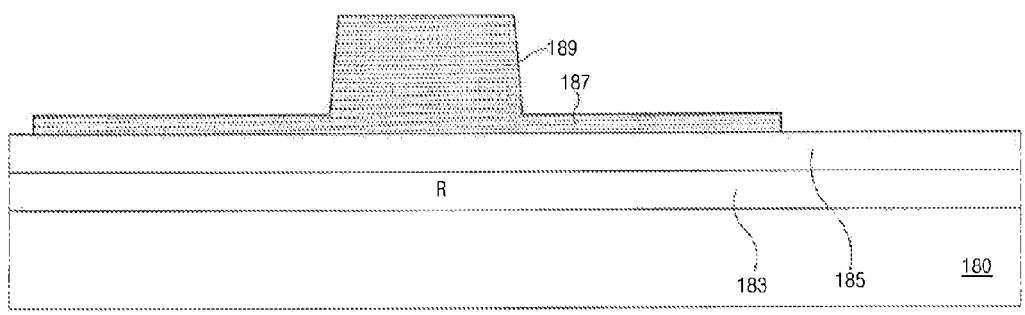

In FIGS. 5D and 6D, the black PR layer 186 is developed to form a black stripe 187 having a first thickness and a column spacer 189 having a second thickness greater than the first thickness on the overcoat layer 185 and the color filter substrate is completed. The black stripe 187 may correspond to the gate line 103 (of FIG. 2) and the common line 109 (of FIG. 2), and the column spacer 189 may have a pillar shape.

After the color filter substrate is completed, a seal pattern (not shown) is formed on one of the first substrate 102 (of FIGS. 3 and 4) and the second substrate 180. Next, the first and second substrates 102 and 180 are attached to each other and a liquid crystal layer 190 is formed between the first and second substrates 102 and 180.

Since the black stripe 187 of an organic material including a black pigment functions as a black matrix for blocking a light, a light leakage may be prevented without a black matrix in the LCD device including the color filter substrate according to the present invention. In addition, since a step of forming a black matrix is omitted, a number of mask process for the LCD device including the color filter substrate according to the present invention is reduced. As a result, fabrication process is simplified and fabrication cost including material cost is reduced.

Recently, the LCD device has been widely used for a three-dimensional (3D) image display system.

Figure 7:
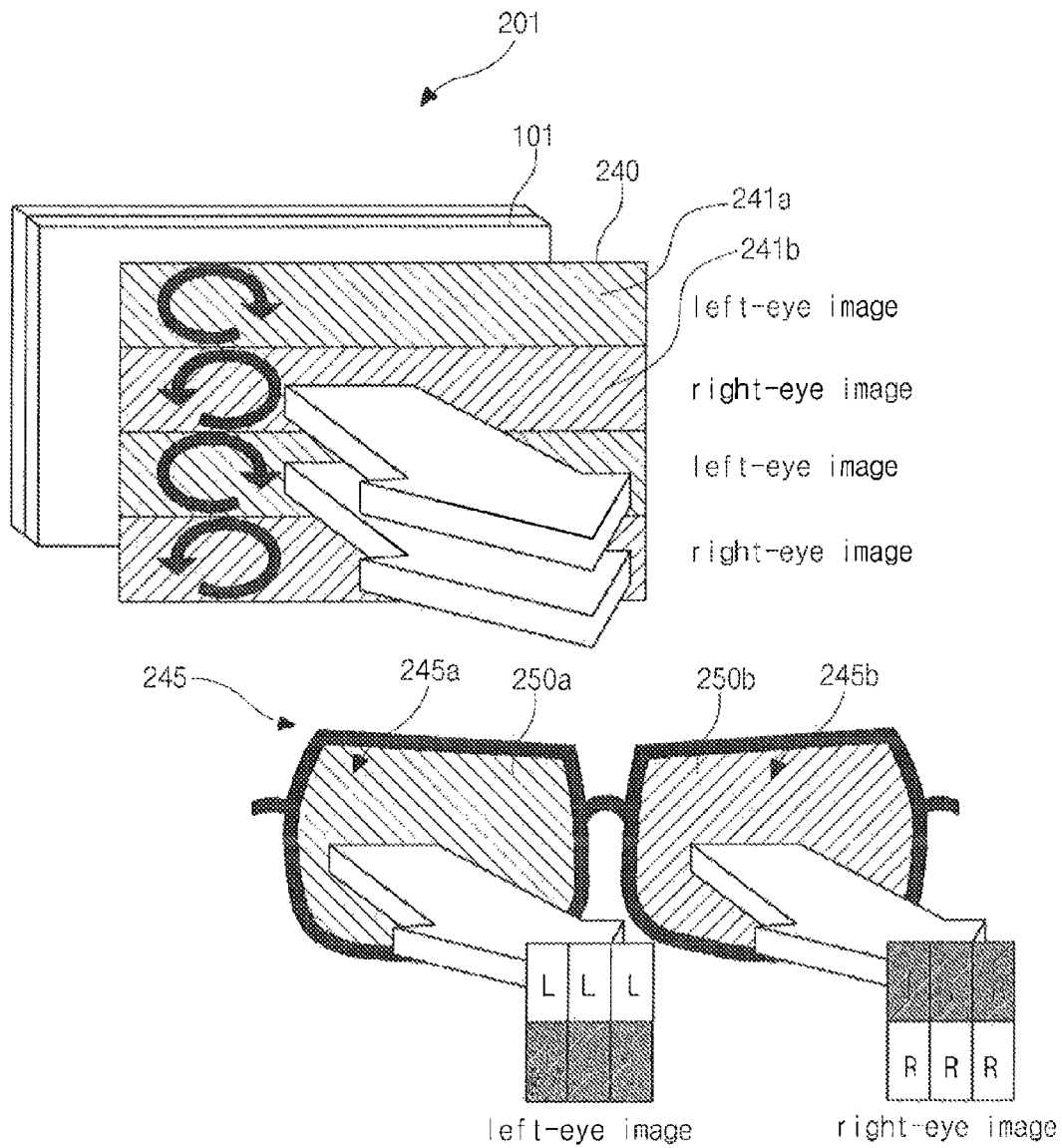
FIG. 7 is an exploded perspective view showing a three-dimensional image display system according to an embodiment of the present invention.

FIG. 7 is an exploded perspective view showing a three-dimensional image display system according to an embodiment of the present invention.

In FIG. 7, a three-dimensional image display system 201 includes a liquid crystal display (LCD) device 101, a patterned retarder 240 on an outer surface of the LCD device 101 and a pair of glasses 245 selectively transmitting images from the LCD device 101 through the patterned retarder 240. Although not shown, first and second polarizing plates are formed on outer surfaces of the LCD device 101, respectively. A polarization axis of the first polarizing plate may be perpendicular to a polarization axis of the second polarizing plate. The LCD device 101 may include the first and second substrates 102 and 180 (of FIG. 3), a liquid crystal layer 190 (of FIG. 3) between the first and second substrates 102 and 180 and a backlight unit (not shown) under the first substrate 102. The LCD device 101 may have odd and even pixel rows (not shown) alternating with each other.

The patterned retarder 240 may be formed of a birefractive material and may have first and second regions 241a and 241b alternating with each other. The first and second regions 241a and 241b may correspond to the odd and even pixel rows, respectively, of the LCD device 101. In addition, the first and second regions 241a and 241b may differently change polarization states of light passing through the second polarizing plate of the LCD device 101. For example, the first region 241a may change the linearly polarized light passing through the second polarizing plate to a left-handed circularly polarized light and the second region 241b may change the linearly polarized light passing through the second polarizing plate to a right-handed circularly polarized light.

The patterned retarder 240 may have a phase difference of $\lambda/4$ (quarter wave). In addition, an optical axis of the patterned retarder 240 may have one of about $+45°$ and about $-45°$ with respect to a transmission axis of the second polarizing plate of the LCD device 101.

For example, the pixels in the odd pixel rows of the liquid crystal display device 101 may display a left-eye image and the pixels in the even pixel rows of the liquid crystal display device 101 may display a right-eye image. Accordingly, the left-handed circularly polarized light of the left-eye image may be emitted from the first region 241a corresponding to the odd pixel rows and the right-handed circularly polarized light of the right-eye image may be emitted from the second region 241b corresponding to the even pixel rows.

The pair of glasses 245 includes lenses 245a and 245b of a transparent glass, retardation films 250a and 250b each having a phase difference of $\lambda/4$ (quarter wave) and polarizing films (not shown). For example, a left-eye retardation film of $\lambda/4$ 250a and a left-eye polarizing film (not shown) may be sequentially formed on an inner surface of a left-eye lens 245a, and a right-eye retardation film of $\lambda/4$ 250b and a right-eye polarizing film (not shown) may be sequentially formed on an inner surface of a right-eye lens 245b. Each of the retardation films 250a and 250b of $\lambda/4$ changes the circularly polarized light into a linearly polarized light, and each of the polarizing films and filters the linearly polarized light according to a polarization axis.

As a result, when a user wearing the pair of glasses 245 watches the images displayed by the LCD device 101 through the patterned retarder 240, the left-eye image and the right-eye image selectively pass through the pair of glasses 245 and the user recognizes a three-dimensional image by combining the left-eye image and the right-eye image. For example, the left-eye lens 245a, the left-eye retardation film 250a and the left-eye polarizing film may transmit the left-eye image and may block the right-eye image. In addition, the right-eye lens 245b, the right-eye retardation film 250b and the right-eye polarizing film may transmit the right-eye image and may block the left-eye image.

The patterned retarder 240 is one of the most important elements for the three-dimensional image display system 201. However, since fabrication process for a patterned retarder according to the related art is complicated, the patterned retarder according to the related art may cause increase in fabrication cost for a three-dimensional image display system.

Figure 8:
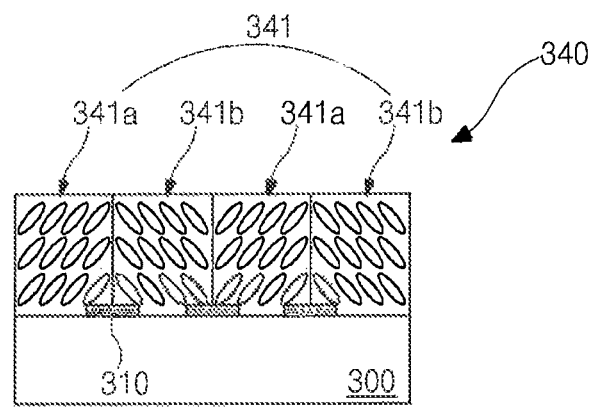
FIG. 8 is a cross-sectional view showing a patterned retarder for a three-dimensional image display system according to the related art.
Figure 9:
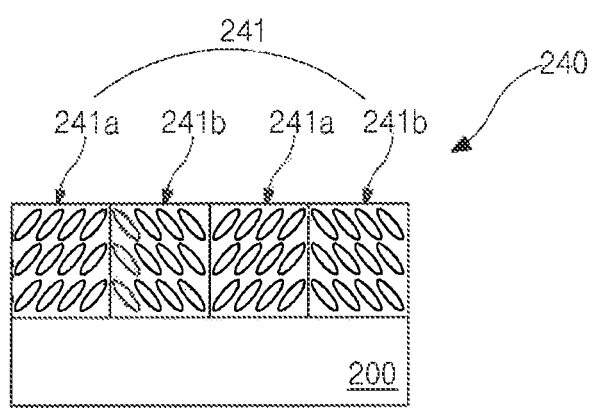
FIG. 9 is a cross-sectional view showing a patterned retarder for a three-dimensional image display system according to an embodiment of the present invention.

FIG. 8 is a cross-sectional view showing a patterned retarder for a three-dimensional image display system according to the related art, and FIG. 9 is a cross-sectional view showing a patterned retarder for a three-dimensional image display system according to an embodiment of the present invention.

In FIG. 8, a patterned retarder 340 according to the related art includes a base film 300, a light shielding pattern 310 and a retarder material layer 341. The light shielding pattern 310 is formed on the base film 300, and the retarder material layer 341 is formed on the light shielding pattern 310. The retarder material layer 341 includes first and second regions 341a and 341b alternating with each other, and the light shielding pattern 310 corresponds to a border portion between the first and second regions 341a and 341b. The first and second region 341a and 341b differently change polarization states of light. For example, the first region 341a may change the linearly polarized light to a left-handed circularly polarized light, and the second region 341b may change the linearly polarized light to a right-handed circularly polarized light. The light shielding pattern 310 blocks a left-eye image and a right-eye image passing through the border portion to prevent a three-dimensional cross-talk caused by mixing of the left-eye image and the right-eye image.

Accordingly, the patterned retarder 340 according to the related art may be fabricated through a step of forming the light shielding pattern 310, a step of forming the first region 341a of the retarder material layer 341 and a step of forming the second region 341b of the retarder material layer 341.

In FIG. 9, a patterned retarder 240 according to an embodiment of the present invention includes a base film 200 and a retardation material layer 241 on the base film 200. The retarder material layer 241 includes first and second regions 241a and 241b alternating with each other. Since a light shielding pattern is omitted in the patterned retarder 240, the patterned retarder 240 according to an embodiment of the present invention has a simplified fabrication process and a reduced fabrication cost as compared with the patterned retarder 340 according to the related art. As a result, production cost for the three-dimensional image display system is reduced.

In a color filter substrate for a liquid crystal display device according to an embodiment of the present invention, a black stripe 187 that is simultaneously formed with a column spacer 189 has a width corresponding to a width of the light shielding pattern 310 of the patterned retarder 340 according to the related art. In addition, the black stripe 187 is disposed to correspond to a border portion between first and second regions 241a and 241b of the patterned retarder 240 according to the present invention. Accordingly, the black stripe 187 of the color filter substrate may be used as a light shielding pattern of a patterned retarder.

For example, the black stripe 187 may be formed to correspond to the gate line and the common line such that the black stripe 187 of the color filter substrate according to the present invention has the same shape as the light shielding pattern of the patterned retarder according to the related art. Accordingly, the black stripe 187 of the color filter substrate may function as the light shielding pattern of the patterned retarder.

Consequentially, in a three-dimensional image display system including a liquid crystal display device, a patterned retarder and a pair of glasses and a method of fabricating the three-dimensional image display system, a black stripe and a column spacer are formed in the liquid crystal display device through a single mask process and a light shielding pattern in the patterned retarder is omitted. Since the black stripe functions as the light shielding pattern, a three-dimensional crosstalk is prevented in the three-dimensional image display system without the light shielding pattern. In addition, since the light shielding pattern is omitted without increase in fabrication steps for the liquid crystal display device, fabrication process for the three-dimensional image display system is simplified and fabrication cost is reduced.

It will be apparent to those skilled in the art that various modifications and variations can be made in a liquid crystal display device and a method of fabricating the liquid crystal display device of the present disclosure without departing from the spirit or scope of the invention. Thus, it is intended that the present invention covers the modifications and variations of this invention provided they come within the scope of the appended claims and their equivalents.

The invention claimed is:

1. A liquid crystal display device, comprising:
first and second substrates facing and spaced apart from each other;
a gate line and a data line on an inner surface of the first substrate, the gate line and the data line crossing each other to define a pixel region;
a common line parallel to and spaced apart from the gate line in a plan view;
a thin film transistor connected to the gate line and the data line;
a plurality of pixel electrodes and a plurality of common electrodes in the pixel region, the plurality of pixel electrodes and the plurality of common electrodes alternating with each other;
a color filter layer on an inner surface of the second substrate, the color filter layer including red, green and blue color filters;
a black stripe and a column spacer on the color filter layer, the black stripe having a first thickness and the column spacer having a second thickness greater than the first thickness, and the black stripe corresponding to the gate line;
a patterned retarder on an outer surface of the second substrate, the patterned retarder including first and second regions alternating with each other, wherein the black stripe corresponds to a border portion between the first and second regions and is disposed between the first substrate and the second substrate to block a cross-talk caused by mixing of images of the first and second regions, and wherein the patterned retarder includes a base film and a retardation material layer directly on the base film without an intervening light shielding pattern; and
a liquid crystal layer between the first and second substrates,
wherein the black stripe completely covers the gate line, the common line and a gap region between the gate line and the common line in a plan view, and the black stripe is parallel to the gate line and crosses the data line.

2. The device according to claim 1, further comprising an overcoat layer between the color filter layer and the black stripe, the overcoat layer having a flat top surface.

3. The device according to claim 1, wherein the black stripe and the column spacer include an organic material having a black pigment.

4. The device according to claim 1, further comprising
an auxiliary common line extending from the common line and parallel to the data line,
wherein one of the plurality of common electrodes shields a gap region between the data line and the auxiliary common line and overlaps the data line and the auxiliary common line.

5. The device according to claim 4, further comprising:
an auxiliary pixel pattern connected to ends of the plurality of pixel electrodes and connected to a drain electrode of the thin film transistor; and
an auxiliary common pattern connected to ends of the plurality of common electrodes and connected to the auxiliary common line.

6. A three-dimensional image display system, comprising:
a liquid crystal display device comprising:
first and second substrates facing and spaced apart from each other;
a gate line and a data line on an inner surface of the first substrate, the gate line and the data line crossing each other to define a pixel region;
a common line parallel to and spaced apart from the gate line in a plan view;
a thin film transistor connected to the gate line and the data line;
a plurality of pixel electrodes and a plurality of common electrodes in the pixel region, the plurality of pixel electrodes and the plurality of common electrodes alternating with each other;
a color filter layer on an inner surface of the second substrate, the color filter layer including red, green and blue color filters;
a black stripe and a column spacer on the color filter layer, the black stripe having a first thickness and the column spacer having a second thickness greater than the first thickness, and the black stripe corresponding to the gate line; and
a liquid crystal layer between the first and second substrates; and
a patterned retarder on an outer surface of the second substrate, the patterned retarder including first and second regions alternating with each other,
wherein the black stripe corresponds to a border portion between the first and second regions and is disposed between the first substrate and the second substrate to block a cross-talk caused by mixing of images of the first and second regions,
wherein the patterned retarder includes a base film and a retardation material layer directly on the base film without an intervening light shielding pattern, and
wherein the black stripe completely covers the gate line, the common line and a gap region between the gate line and the common line in a plan view, and the black stripe is parallel to the gate line and crosses the data line.

7. The system according to claim 6, further comprising an overcoat layer between the color filter layer and the black stripe, the overcoat layer having a flat top surface.

8. The system according to claim 6, wherein the black stripe and the column spacer include an organic material having a black pigment.

9. The system according to claim 6, wherein the liquid crystal display device includes odd and even pixel rows, and the first and second regions correspond to the odd and even pixel rows, respectively.

10. The system according to claim 6, wherein the liquid crystal display device further comprises:
an auxiliary common line extending from the common line and parallel to the data line,
wherein one of the plurality of common electrodes shields a gap region between the data line and the auxiliary common line and overlaps the data line and the auxiliary common line.

11. The system according to claim 10, wherein the liquid crystal display device further comprises:
an auxiliary pixel pattern connected to ends of the plurality of pixel electrodes and connected to a drain electrode of the thin film transistor; and an auxiliary common pattern connected to ends of the plurality of common electrodes and connected to the auxiliary common line.

12. The system according to claim 6, further comprising a pair of glasses, images from the liquid crystal display device passing through the patterned retarder and then selectively passing through the pair of glasses.

13. A method of fabricating a liquid crystal display device, comprising:
  forming a gate line and a data line on a first substrate, the gate line and the data line crossing each other to define a pixel region;
  forming a common line parallel to and spaced apart from the gate line in a plan view;
  forming a thin film transistor connected to the gate line and the data line;
  forming a plurality of pixel electrodes and a plurality of common electrodes in the pixel region, the plurality of pixel electrodes and the plurality of common electrodes alternating with each other;
  forming a color filter layer on a second substrate, the color filter layer including red, green and blue color filters;
  forming a black stripe and a column spacer on the color filter layer, the black stripe having a first thickness and the column spacer having a second thickness greater than the first thickness;
  attaching the first and second substrates such that the black stripe is between the first and second substrates and the black stripe corresponds to the gate line;
  attaching a patterned retarder on an outer surface of the second substrate, the patterned retarder including first and second regions alternating with each other, wherein the black stripe corresponds to a border portion between the first and second regions and is disposed between the first substrate and the second substrate to block a cross-talk caused by mixing of images of the first and second regions, and wherein the patterned retarder includes a base film and a retardation material layer directly on the base film without an intervening light shielding pattern; and
  forming a liquid crystal layer between the first and second substrates,
  wherein the black stripe completely covers the gate line, the common line and a gap region between the gate line and the common line in a plan view, and the black stripe is parallel to the gate line and crosses the data line.

14. The method according to claim 13, further comprising forming an overcoat layer between the color filter layer and the black stripe, the overcoat layer having a flat top surface.

15. The method according to claim 13, wherein forming the black stripe and the column spacer comprises:
  coating a photosensitive organic material having a black pigment on the color filter layer to form a black photoresist layer;
  irradiating a light onto the black photoresist layer through a photomask having a blocking area, a transmissive area and a half-transmissive area; and
  developing the black photoresist layer to form the black stripe and the column spacer.

16. The method according to claim 15, wherein the black photoresist layer has a negative photosensitive type, and wherein the transmissive area corresponds to the column spacer, the half-transmissive area corresponds to the black stripe and the blocking area corresponds to a portion where the black photoresist layer is removed.

17. A method of fabricating a three-dimensional image display system, comprising:
  forming a gate line and a data line on a first substrate, the gate line and the data line crossing each other to define a pixel region;
  forming a common line parallel to and spaced apart from the gate line in a plan view;
  forming a thin film transistor connected to the gate line and the data line;
  forming a plurality of pixel electrodes and a plurality of common electrodes in the pixel region, the plurality of pixel electrodes and the plurality of common electrodes alternating with each other;
  forming a color filter layer on a second substrate, the color filter layer including red, green and blue color filters;
  forming a black stripe and a column spacer on the color filter layer, the black stripe having a first thickness and the column spacer having a second thickness greater than the first thickness;
  attaching the first and second substrates such that the black stripe is between the first and second substrates and the black stripe corresponds to the gate line;
  forming a liquid crystal layer between the first and second substrates; and
  attaching a patterned retarder on an outer surface of the second substrate, the patterned retarder including first and second regions alternating with each other,
  wherein the black stripe corresponds to a border, portion between the first and second regions and is disposed between the first substrate and the second substrate to block a cross-talk caused by mixing of images of the first and second regions,
  wherein the patterned retarder includes a base film and a retardation material layer directly on the base film without an intervening light shielding pattern, and
  wherein the black stripe completely covers the gate line, the common line and a gap region between the gate line and the common line in a plan view, and the black stripe is parallel to the gate line and crosses the data line.

18. The method according to claim 17, wherein forming the black stripe and the column spacer comprises:
  coating a photosensitive organic material having a black pigment on the color filter layer to form a black photoresist layer;
  irradiating a light onto the black photoresist layer through a photomask having a blocking area, a transmissive area and a half-transmissive area; and
  developing the black photoresist layer to form the black stripe and the column spacer.

19. The method according to claim 18, wherein the black photoresist layer has a negative photosensitive type, and wherein the transmissive area corresponds to the column spacer, the half-transmissive area corresponds to the black stripe and the blocking area corresponds to a portion where the black photoresist layer is removed.

* * * * *